(12) United States Patent
Håland

(10) Patent No.: US 7,503,950 B2
(45) Date of Patent: Mar. 17, 2009

(54) ASSEMBLY TO SEPARATE LIQUID FROM A MULTIPHASE FLOW

(75) Inventor: Trygve Håland, Tananger (NO)

(73) Assignee: Statoil ASA, Stavanger (NO)

( * ) Notice: Subject to any disclaimer, the term of this patent is extended or adjusted under 35 U.S.C. 154(b) by 510 days.

(21) Appl. No.: 10/518,726

(22) PCT Filed: Jun. 19, 2003

(86) PCT No.: PCT/NO03/00205

§ 371 (c)(1),
(2), (4) Date: Jun. 3, 2005

(87) PCT Pub. No.: WO04/000438

PCT Pub. Date: Dec. 31, 2003

(65) Prior Publication Data

US 2005/0252837 A1    Nov. 17, 2005

(30) Foreign Application Priority Data

Jun. 21, 2002  (NO) .................................. 20023021

(51) Int. Cl.
*B01D 45/12* (2006.01)
*B01D 50/00* (2006.01)

(52) U.S. Cl. .............................. 55/315; 55/338; 55/396; 55/421; 55/457; 96/182; 96/208; 96/216

(58) Field of Classification Search .................. 55/318, 55/338, 394, 396, 421, 457; 96/182, 208, 96/216; 210/259
See application file for complete search history.

(56) References Cited

U.S. PATENT DOCUMENTS 6,752,845 B2 *   6/2004   Haland ........................ 55/340

* cited by examiner

*Primary Examiner*—Robert A Hopkins
(74) *Attorney, Agent, or Firm*—Jeffrey Pearce

(57) ABSTRACT

Assembly to separate out liquid frotfi a multiphase fluid flow, comprising a scrubber, a column, a separator or other conventional separation equipment, combined with a deliquidizer that is connected as a preseparator to the fluid inlet. in that the deliquidizer functions according to a cyclone principle. With the assembly according to the invention the deliquidizer is modified such that it can be combined with conventional separation equipment such that a surprising improved technical effect is achieved. More specific the improved technical effect is achieved for assemblies where the deliquidizer is vertically oriented placed outside conventional separation equipment, with main flow direction upwards or downwards, or with the deliquidizer placed within conventional separation equipment.

6 Claims, 3 Drawing Sheets

ASSEMBLY TO SEPARATE LIQUID FROM A MULTIPHASE FLOW

FIELD OF THE INVENTION

The present invention regards separation of liquid from a multiphase fluid flow. More specific the present invention regards an assembly to separate a liquid from a multiphase fluid flow, comprising a scrubber, a column, a separator or another conventional separation equipment assembled with a deliquidizer such that the deliquidizer functions as a preseparator. With the assembly according to the invention reduced space and weight are achieved compared to prior art separation assemblies.

BACKGROUND OF THE INVENTION AND PRIOR ART

In process plants in general, and in particular for processing of hydrocarbons on platforms or vessels offshore, it is essential that the separation equipment is light, of low volume and is economical beneficial compared to the technical effect achieved. To achieve beneficial effects different types of separation equipment can be combined.

In patent application Ser. No. 2000 6656, available to the public from 24 Jun. 2002, it is mentioned that a deliquidizer (denoted a device), which is the topic for said patent application, can be combined with other conventional separation equipment to achieve a beneficial increased separation effect. In connection with the assembly of the deliquidizer with other equipment it is mentioned on page 2, lines 4-7 that "The device according to the invention can be used as an inlet arrangement to scrubbers and separators to improve the effect of such equipment. Further the device can be used as a free-standing unit in pipes and pipelines in oil/gas wells, in pipelines on shore or on the seabed, or in process plants on shore or offshore." On page 2, lines 35-36 it is mentioned that "The device can be mounted both horizontally or vertically with certain constructional changes." On page 5, lines 3-6 it is mentioned that "The vessel 16 can e.g. be a separator, a scrubber or a T-pipe element, dependent on the actual utilization. The vessel can optionally be equipped with a more or less advanced demister, to dry the recirculation gas to an appropriate level, dependent on the utilization." Eventually it is mentioned on page 5, lines 14-16 that "By the simplest utilization of the deliquidizer, e.g. in the inlet to a separator or scrubber, it will not be any demand for monitoring or control of the device."

In the above mentioned publication NO 2000 6656 there is no description of the "certain constructional changes" that has to be undertaken for the deliquidizer to be mounted either horizontally or vertically. Neither is it mentioned that the deliquidizer can be placed within separation equipment of conventional type, such that the outlets for liquid and gas both are within the separation equipment.

There is a demand for assemblies for separation of liquid from a multiphase fluid flow, with lower weight, lesser volume and better technical effect.

The aim of the present invention is to meet the above-mentioned demand by providing assemblies between the above-mentioned deliquidizer and equipment of conventional type, in ways novel for the skilled person, including certain modifications of the deliquidizer, to achieve improved separation effect, reduced volume and weight, and thereby beneficial technical effect.

SUMMARY OF THE INVENTION

The demand is unexpectedly met in that an assembly is provided for separating liquid from a multiphase fluid flow, comprising a scrubber, a column, a separator or other conventional separation equipment combined with a deliquidizer that is connected as a preseparator to the fluid inlet, in which deliquidizer the fluid flow is set into rotation so that it is separated in a central zone along the longitudinal axis, which central zone in substance contains gas, and an outer annular zone against the inside of the outer wall, which outer zone in substance contains liquid, from which central zone an outlet means for gas is arranged and from which outer zone an outlet means for liquid is arranged, in that the deliquidizer is functioning according to a cyclone principle.

The assembly according to the invention is distinguished in that it is comprising a deliquidizer with

- an in substance pipe formed casing arranged to constitute a section of the pipeline proper or the inlet, in that a spin element for rotation of the fluid flow is located at the upstream end of the casing,
- an outlet means for gas comprising an outlet element arranged at the downstream end of the casing, which outlet means has a central, axial passage way for the gas, and an outer surface that together with the inner surface of the casing forms an annulus for inflow of liquid, in that a barrier is formed at the downstream end of the element for the liquid, and optionally an antispin element is arranged at the downstream end of the gas outlet means,
- an outlet means for liquid comprising an upward open vessel that is arranged at the downstream end of the casing, or at the upstream end by main flow direction upwards, which outlet means is arranged for taking up liquid that flows into the annulus and partly flows down into the vessel from the bottom region of the casing at the vessel opening, and partly falls down into the vessel from the region at said barrier, and
- an upper section of the outlet vessel and a central part of the inlet spin element upstream end have been connected by use of a line, optionally with a regulation valve in the line, for recirculation of gas that can be entrained by liquid that flows or falls down into the vessel, in that the spin element has a central void space and is provided with a number of openings for outflow of recirculated gas from the void space.

With the assembly according to the invention the deliquidizer is modified so that it can be combined with conventional separation equipment such that a surprising improved technical effect is achieved. More specific the improved technical effect is achieved for assemblies where the deliquidizer is vertically oriented placed outside the conventional separation equipment, with main flow direction upwards or downwards, or with the deliquidizer placed within conventional separation equipment. The deliquidizer with the main flow direction vertical upwards is modified such that it differs essentially from the deliquidizer according to NO 2000 6656.

The deliquidizer is preferably located within the further separation equipment and constitutes an elongation of the inlet, in that the deliquidizer preferably has main flow direction vertical upwards or vertical downwards, or the deliquidizer is arranged horizontally within the further separation means.

The deliquidizer is preferably arranged outside the further separation-equipment and has main flow direction either vertical downwards or vertical upwards.

The deliquidizer is preferably arranged with main flow direction vertical upwards, in that the deliquidizer is comprising a further casing outside the gas/liquid separation pipe, to collect separated liquid, and an outer cone for the gas outlet pipe, contributing in turning the liquid flow 180° in relation to the main flow direction.

DRAWINGS

DETAILED DESCRIPTION

Figure 1:
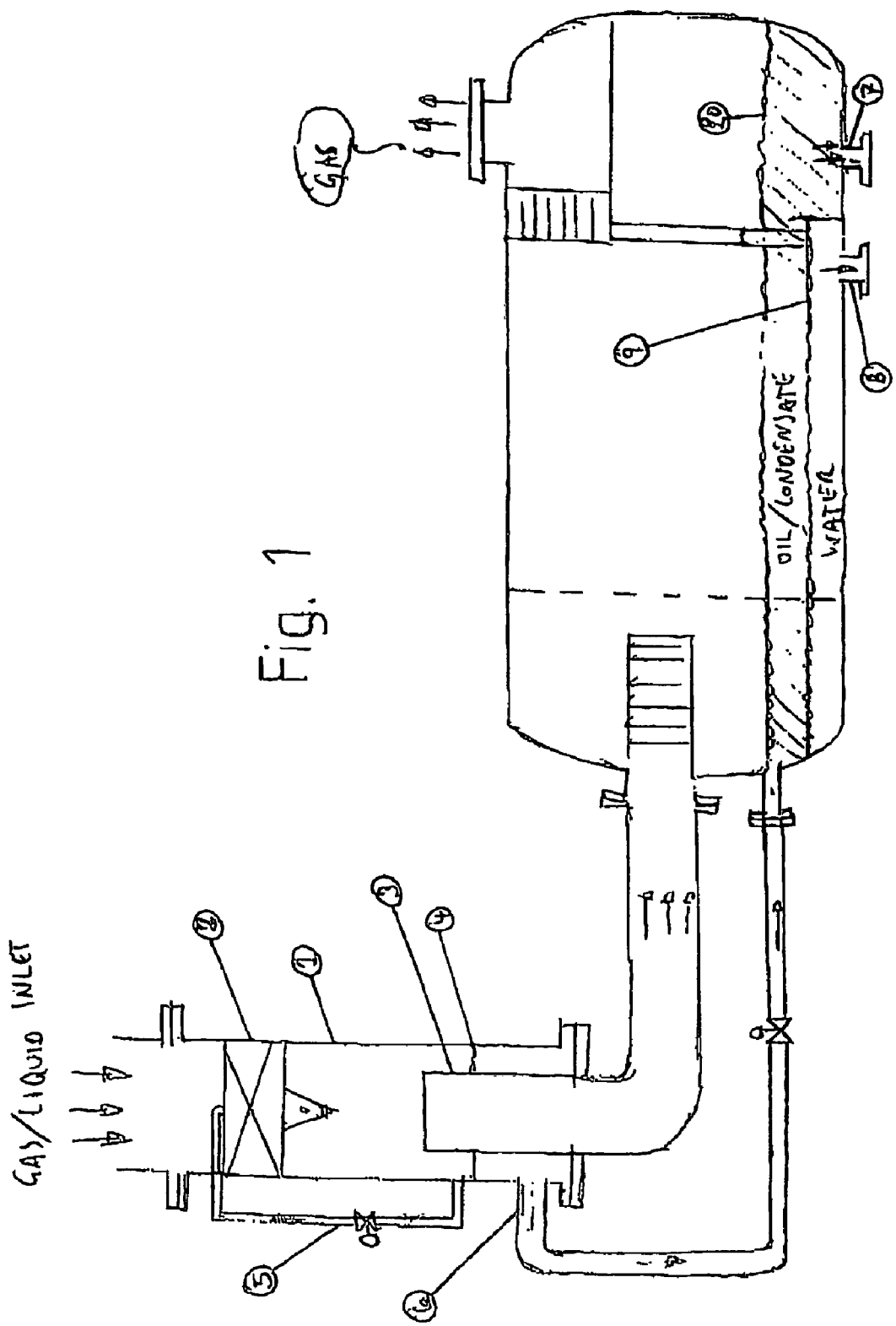
FIG. 1 illustrates an assembly according to the invention in form of a vertically mounted deliquidizer with main flow direction downwards, in front of a three phase separator.

Reference is first made to FIG. 1 that illustrates an assembly according to the invention, more specific a vertically mounted deliquidizer with main flow direction downwards, combined with a three phase separator by mounting the deliquidizer in the inlet to the three phase separator. More specific a vertical deliquidizer 1 in the inlet pipe to the three phase separator is illustrated, where a spin element 2 is arranged in the upstream end, and a gas outlet 3 passing gas from the deliquidizer into the zone for gas in the three phase separator. Further, the liquid level 4 in the deliquidizer is illustrated. A recirculation line 5 with regulation valve is arranged from the outer zone in the deliquidizer, just above the liquid level, to the spin element 2. A liquid outlet 6 from the deliquidizer is arranged to pass liquid from the liquid region in the three phase separator, by use of a pipe with a regulation valve. The three phase separator has in the bottom both an outlet for oil/condensate 7 and an outlet for water 8. In the upper part of the three phase separator an outlet for gas is provided. Further, the water level 9 in the three phase separator is illustrated, as well as the oil level 10.

Figure 2:
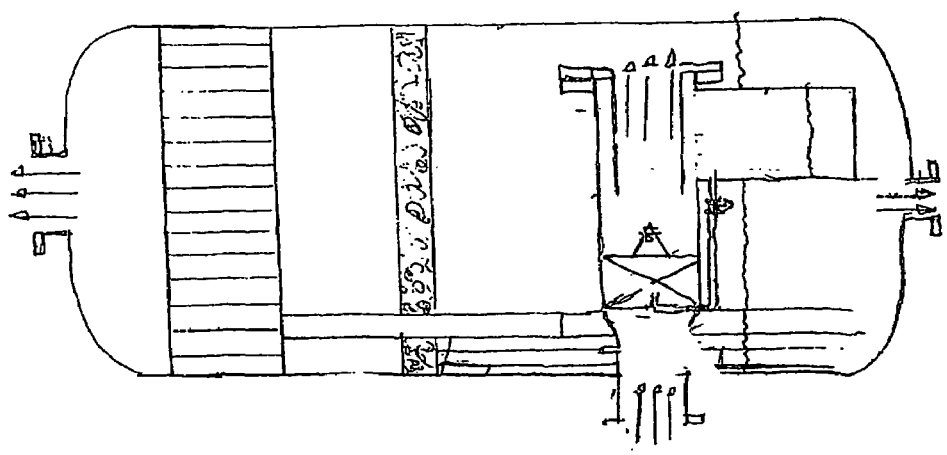
FIG. 2 illustrates an assembly according to the invention where the deliquidizer is mounted horizontally within a two phase gas scrubber, in elongation from the inlet.

FIG. 2 illustrates an assembly according to the invention, more specific a deliquidizer horizontally mounted as inlet arrangement within a vertical oriented two phase gas scrubber. In this case the deliquidizer is quite similar to the deliquidizer according to NO 2000 6656, but in particular the gas outlet means is modified since the gas outlet is directly into the two phase gas scrubber. Equipment is arranged in the upper part of the two phase gas scrubber for collecting droplets entrained by the gas, more specific demisters or cyclones of known types. On the figure, illustrated horizontally, is the inlet for gas and liquid on the left side, the outlet for gas is from the top of the gas scrubber while the liquid outlet is in the bottom.

Figure 3:
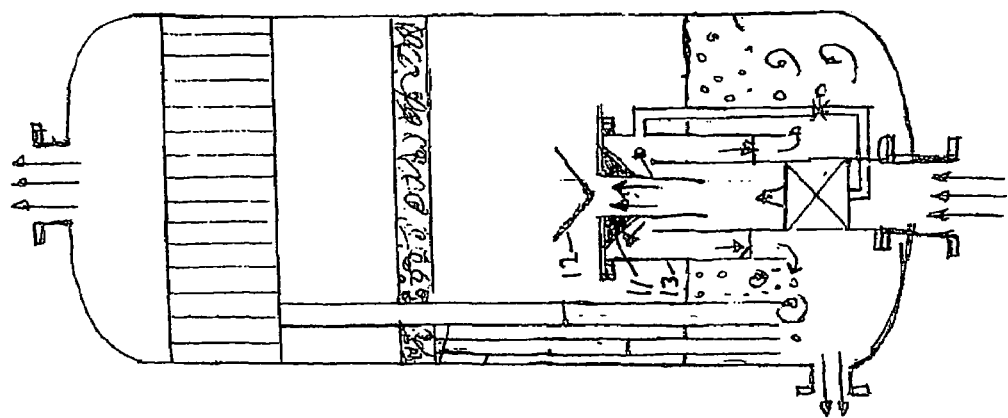
FIG. 3 illustrates an assembly according to the invention with a deliquidizer vertically mounted within a two phase scrubber, with main flow direction upwards in the deliquidizer.

Reference is made to FIG. 3 that illustrates an assembly according to the invention in form of a deliquidizer vertically mounted as inlet arrangement within a vertically oriented two phase gas scrubber with main flow direction upwards in the deliquidizer. In this embodiment the deliquidizer is modified by a cone 11 arranged around the gas outlet from the deliquidizer, and also a spreading cone 12 for gas is arranged directly downstream the outlet for gas from the deliquidizer, which means just above the deliquidizer since the main flow direction is vertically upwards. Further, it is arranged an additional outer casing 13 outside the gas/liquid separation pipe, to collect entrained liquid that thereby can flow downwards, which means 180° relative to the main flow direction in the deliquidizer. On the figure, illustrated horizontally, is the inlet for gas and liquid in the bottom of the gas scrubber, the outlet for gas is from the top, while the liquid outlet is down at the left side a little over the bottom.

Figure 4:
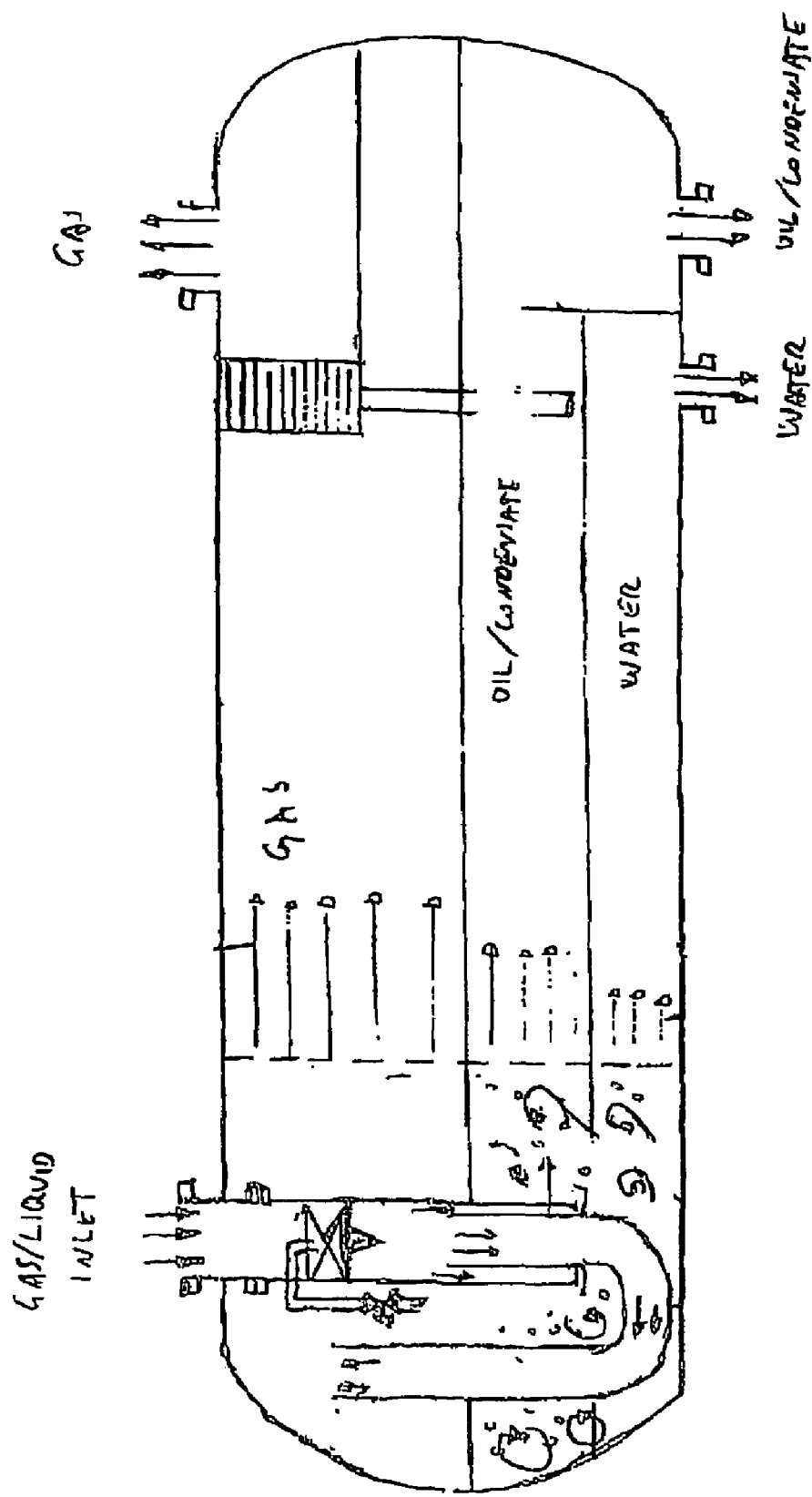
FIG. 4 illustrates an assembly according to the invention with a deliquidizer mounted vertically within a three phase separator, with main flow direction downwards in the deliquidizer.

On FIG. 4 a further assembly according to the invention is illustrated, in form of a deliquidizer arranged in the inlet within a three phase separator, in vertical position with main flow direction downwards. As illustrated the gas outlet from the deliquidizer is essentially modified in that it is bent such that it turns upwards and ends in the gas region in the three phase separator.

The assemblies according to the invention with main flow direction in the deliquidizer either vertically upwards or vertically downwards, have surprisingly resulted in improved technical effect compared to other assemblies. The assemblies according to the invention with a deliquidizer mounted within another separation device have surprisingly resulted in an improved separation effect in less space than other assemblies.

The invention claimed is:

1. An assembly for separating out liquid from a multiphase fluid flow, comprising:

a main separation apparatus that comprises a main vessel, a fluid inlet, a vessel gas outlet, and a vessel liquid outlet;

a deliquidizer that is connected as a preseparator to the fluid inlet, that has a substantially pipe-shaped inner casing, which forms part of an inlet arrangement of the fluid inlet, and an outer casing within which the inner casing extends and opens, and that operates on the principle of a cyclone;

a spin element that is located at an upstream end of the inner casing of the deliquidizier for rotation of the fluid flow such that the fluid flow is separated in a central zone along a longitudinal axis such that liquid is forced outward relative to the gas as a result of the rotation, said spin element having a central void space, and being provided with at least one opening for outflow of separated gas from the void space, said opening forming a gas outlet from the central zone of the deliquidizer into the main vessel;

an annular outer zone formed between the inner casing and the outer casing and forming a liquid outlet path from within the inner casing into the main vessel;

a liquid barrier that is located at a downstream end of the outer casing to direct liquid into the annular outer zone; and a line connecting the annular outer zone and a central section of the spin element for recirculation of gas entrained by liquid entering the main vessel.

2. Assembly according to claim 1, characterized in that the deliquidizer is arranged within the separation apparatus and has a main flow direction vertcally upwards.

3. Assembly according to claim 1, characterized in that the deliquidizer is arranged within the separation apparatus and has main flow direction vertically downwards.

4. Assembly according to claim 1, characterized in that the deliquidizer is arranged horizontally within the separation appartus and consititutes an extension of the fluid inlet.

5. An assembly as in claim 1, further comprising an anti-spin element arranged at the downstream end of the gas outlet from the central zone of the deliquidizer.

6. An arrangement for separating out liquid from a multiphase fluid flow, comprising:
- a main separation appartus that comprises a main vessel, a fluid inlet, a vessel gas outlet, and a vessel liquid outlet;
- a deliquidizer in which an inlet fluid flow has a main flow direction vertically upward and is rotated such that it is separated in a central zone along a longitudinal axis,
- said deliquidizer operating on the principle of a cyclone such that liquid in the inlet fluid flow is forced radially outward and the central zone contains primarily gas,
- said deliquidizer being located within the main separation apparatus and being connected as a pre-separator to the fluid inlet;
- said deliquidizer having a substantially pipe-shaped inner casing and an outer casing within this the inner casing extends and opens, an outer annular zone thereby being formed between the inner and outer casings, said outer annular zone receiving the radially outwardly forced liquid;
- a gas outlet arrangement leading from the central zone of the deliquidizer into the main vessel; and
- an outer cone for the gas outlet arrangement urging the fluid flow from the deliquidizer to turn approximately 180° relative to a main flow direction.

* * * * *